US012127987B2

(12) United States Patent
Nomura et al.

(10) Patent No.: US 12,127,987 B2
(45) **Date of Patent: *Oct. 29, 2024**

(54) CARING DEVICE

(71) Applicant: FUJI CORPORATION, Aichi-ken (JP)

(72) Inventors: Hideaki Nomura, Toyota (JP); Ryu Takahashi, Toyota (JP); Satoshi Shimizu, Toyota (JP)

(73) Assignee: FUJI CORPORATION, Aichi-ken (JP)

( * ) Notice: Subject to any disclaimer, the term of this patent is extended or adjusted under 35 U.S.C. 154(b) by 419 days.

This patent is subject to a terminal disclaimer.

(21) Appl. No.: 17/601,714

(22) PCT Filed: Apr. 12, 2019

(86) PCT No.: PCT/JP2019/016065
§ 371 (c)(1),
(2) Date: Oct. 6, 2021

(87) PCT Pub. No.: WO2020/208832
PCT Pub. Date: Oct. 15, 2020

(65) Prior Publication Data

US 2022/0192908 A1 Jun. 23, 2022

(51) Int. Cl.
*A61G 7/10* (2006.01)
*A61G 5/14* (2006.01)

(52) U.S. Cl.
CPC ............. *A61G 7/1017* (2013.01); *A61G 5/14* (2013.01); *A61G 7/1046* (2013.01);
(Continued)

(58) Field of Classification Search
CPC ...... A61G 7/1017; A61G 5/14; A61G 7/1046; A61G 7/1086; A61G 7/1092;
(Continued)

(56) References Cited

U.S. PATENT DOCUMENTS 5,001,789 A * 3/1991 Schoenberger ...... A61G 7/1096 D12/128
5,117,516 A * 6/1992 Penner ................ A61G 7/1094 5/81.1 R (Continued)

FOREIGN PATENT DOCUMENTS

JP 2011019571 2/2011
JP 2011110080 6/2011

(Continued)

OTHER PUBLICATIONS

"International Search Report (Form PCT/ISA/210) of PCT/JP2019/016065," mailed on Jul. 2, 2019, with English translation thereof, pp. 1-2.

*Primary Examiner* — Myles A Throop
(74) *Attorney, Agent, or Firm* — JCIPRNET

(57) ABSTRACT

A caring device includes an adjustment command section configured to give a command for an adjustment of a standing start position of a support member, a standing operation command section configured to give a command for assistance of the standing operation using the support member, and a control device. The control device perform a cooperative operation of the first arm and the second arm so that the support member moves in an up-down direction when a command of the adjustment command section is received. The control device performs a cooperative operation of the first arm and the second arm so that a reference position of the support member moves along different movement trajectories in accordance with the standing start position adjusted by the command of the adjustment command section when a command of the standing operation command section is received.

15 Claims, 6 Drawing Sheets

(52) U.S. Cl.
CPC ......... *A61G 7/1086* (2013.01); *A61G 7/1092* (2013.01); *A61G 2200/34* (2013.01); *A61G 2200/36* (2013.01); *A61G 2200/52* (2013.01); *A61G 2203/10* (2013.01)

(58) Field of Classification Search
CPC ............ A61G 2200/34; A61G 2200/36; A61G 2200/52; A61G 2203/10; A61G 2203/70
USPC .................................................... 5/86.1, 87.1
See application file for complete search history.

(56) References Cited

U.S. PATENT DOCUMENTS

| | | | | | |
|---|---|---|---|---|---|
| 5,309,584 | A * | 5/1994 | Parker | A61G 7/1094 | 5/87.1 |
| 5,411,044 | A * | 5/1995 | Andolfi | A61H 3/04 | 414/921 |
| 6,119,287 | A * | 9/2000 | Phillips | A61G 7/1046 | 5/81.1 RP |
| 6,806,430 | B2 * | 10/2004 | Downing | G01G 19/44 | 177/144 |
| 8,060,958 | B1 * | 11/2011 | Hough | A61G 7/1017 | 5/83.1 |
| 8,832,874 | B2 * | 9/2014 | Alexander | A61G 7/1017 | 254/10 R |
| 9,009,886 | B2 * | 4/2015 | Hjort | A61G 7/1092 | 5/83.1 |
| 9,050,225 | B2 * | 6/2015 | Ooka | B62K 17/00 | |
| 10,045,895 | B2 * | 8/2018 | Eklof | A61G 7/1094 | |
| 10,813,823 | B2 * | 10/2020 | Liang | A61H 3/04 | |
| 2009/0165203 | A1 * | 7/2009 | Biersteker | A61G 5/14 | 5/83.1 |
| 2009/0165204 | A1 * | 7/2009 | Biersteker | A61G 7/1096 | 5/87.1 |
| 2010/0031439 | A1 * | 2/2010 | Spidare | A61G 7/1017 | 5/87.1 |
| 2011/0056019 | A1 * | 3/2011 | Altena | A61G 7/1053 | 5/87.1 |
| 2013/0263374 | A1 * | 10/2013 | Yamaguchi | A61G 7/1046 | 5/87.1 |
| 2017/0014290 | A1 * | 1/2017 | Tsusaka | A61G 7/1046 | |
| 2019/0183706 | A1 * | 6/2019 | Shimizu | A61G 7/1019 | |
| 2021/0369524 | A1 * | 12/2021 | Noguchi | A61G 7/1096 | |
| 2022/0211562 | A1 * | 7/2022 | Nomura | A61G 7/1046 | |
| 2022/0313523 | A1 * | 10/2022 | Nomura | A61G 7/1046 | |
| 2023/0125855 | A1 * | 4/2023 | Tsukamoto | A61G 7/1092 | 5/86.1 |
| 2023/0127337 | A1 * | 4/2023 | Tsukamoto | A61G 7/1019 | 5/86.1 |
| 2023/0129851 | A1 * | 4/2023 | Nemoto | A61G 7/1086 | 5/86.1 |

FOREIGN PATENT DOCUMENTS

| | | | | |
|---|---|---|---|---|
| JP | 2015139566 | | 8/2015 | |
| WO | 2018116472 | | 6/2018 | |
| WO | 2018163307 | | 9/2018 | |
| WO | WO-2018167856 | A1 * | 9/2018 | A61G 5/12 |

* cited by examiner

[Fig. 1]
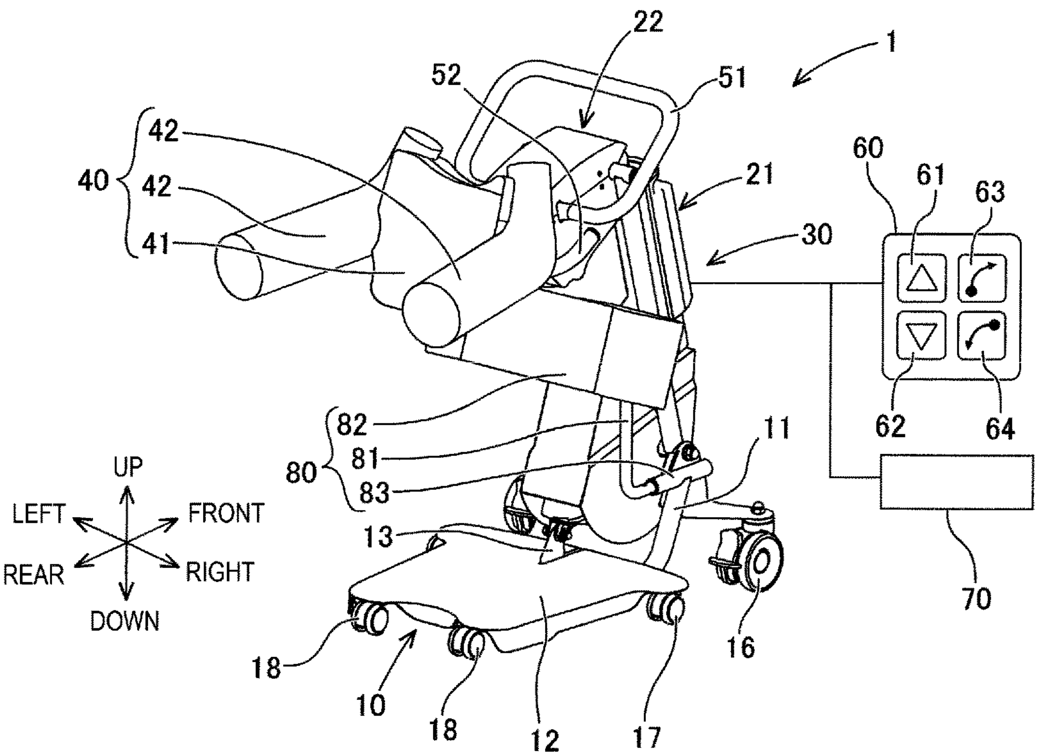
[Fig. 2]
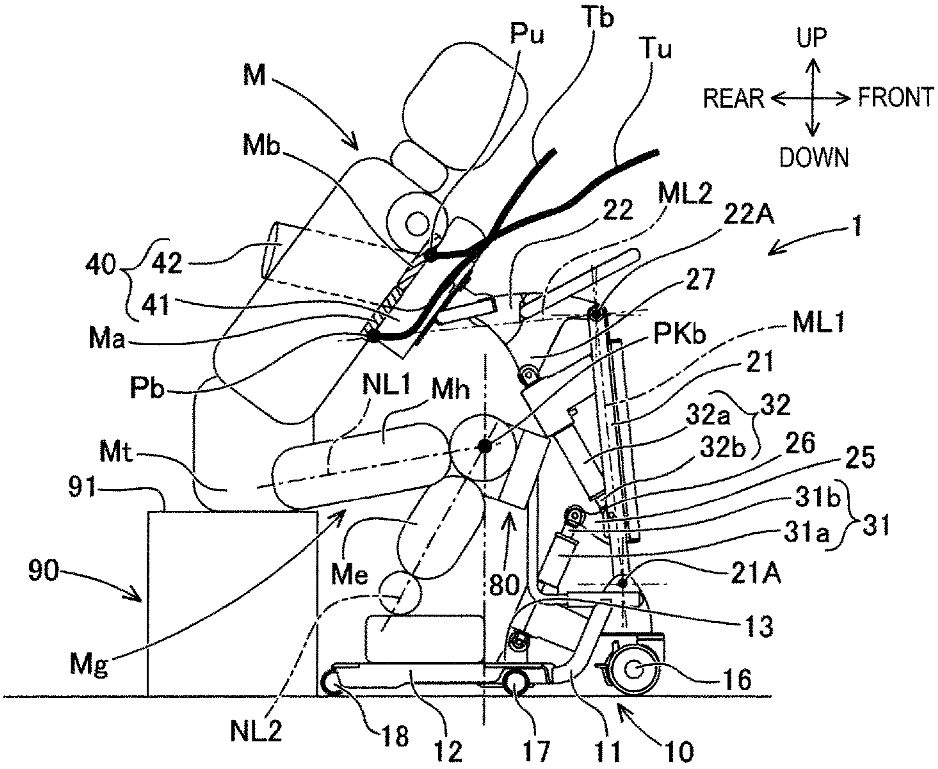

[Fig. 3]
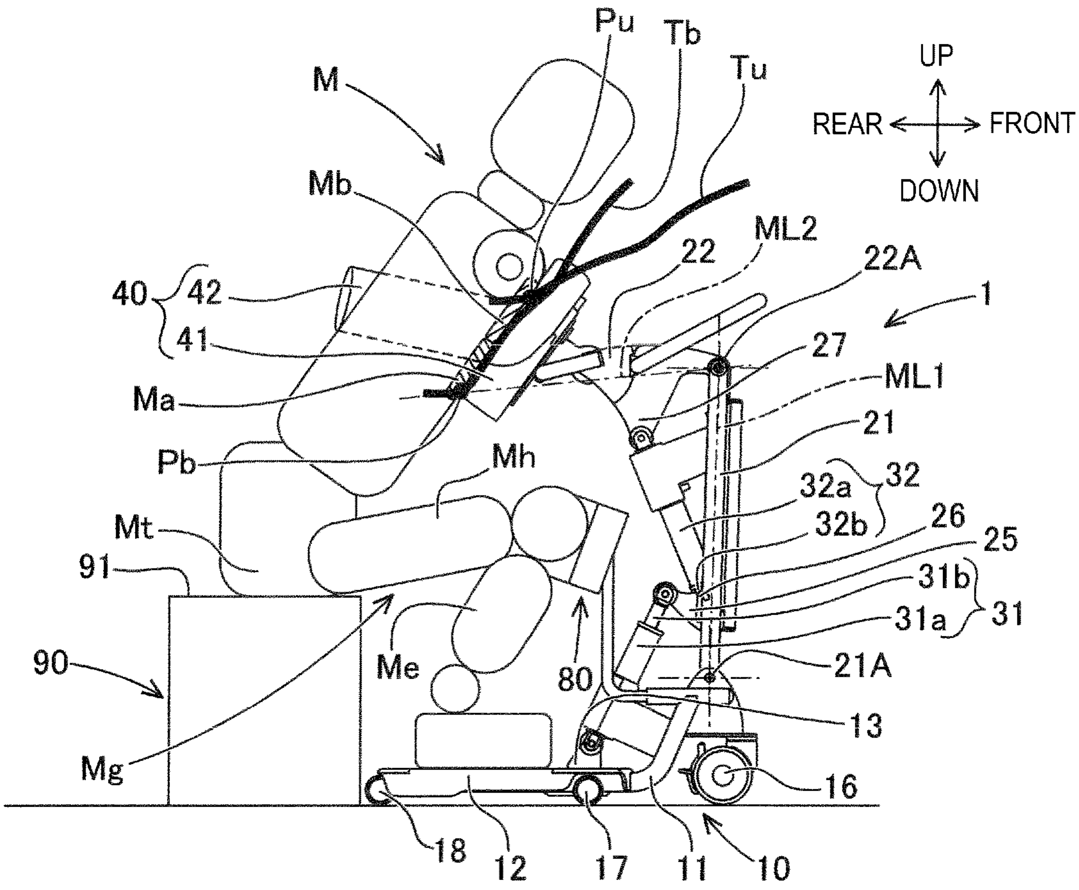

[Fig. 4]
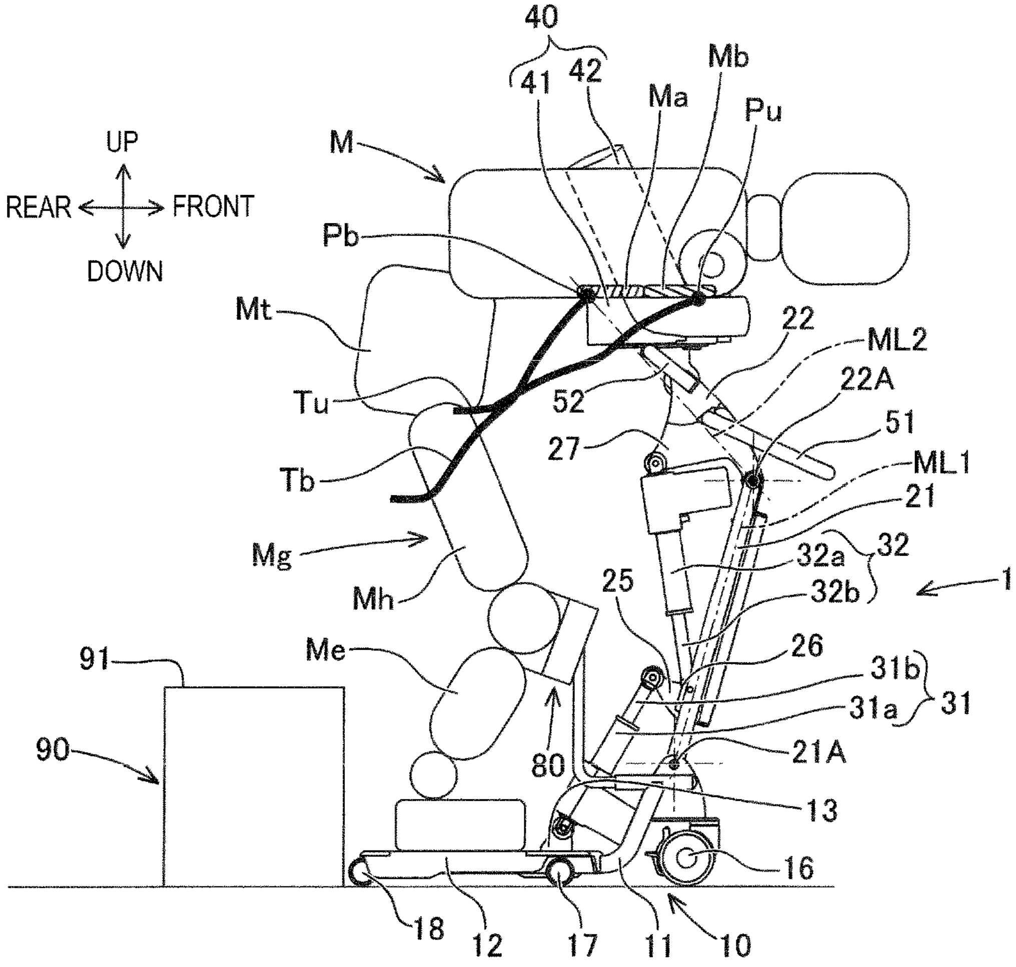
[Fig. 5]
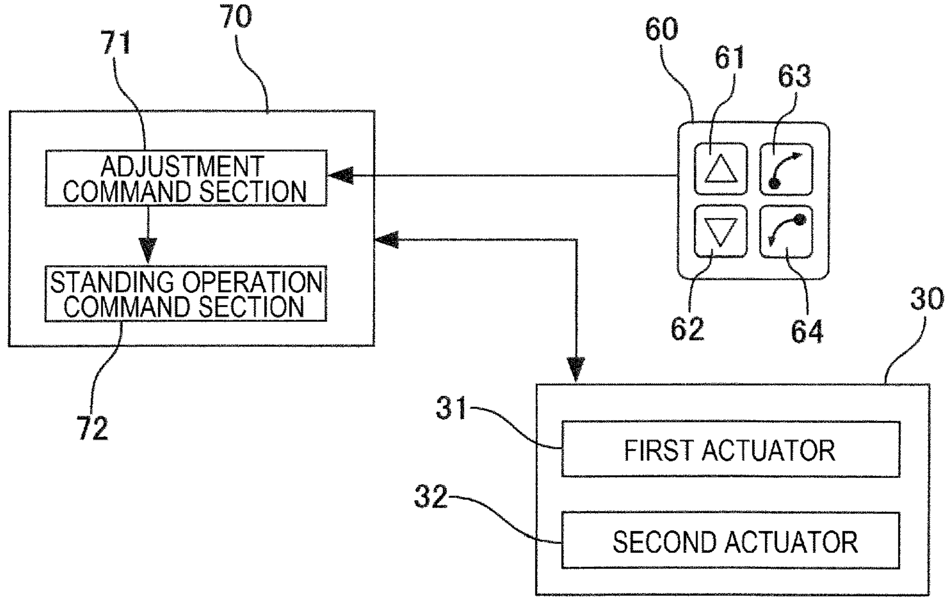

[Fig. 6]
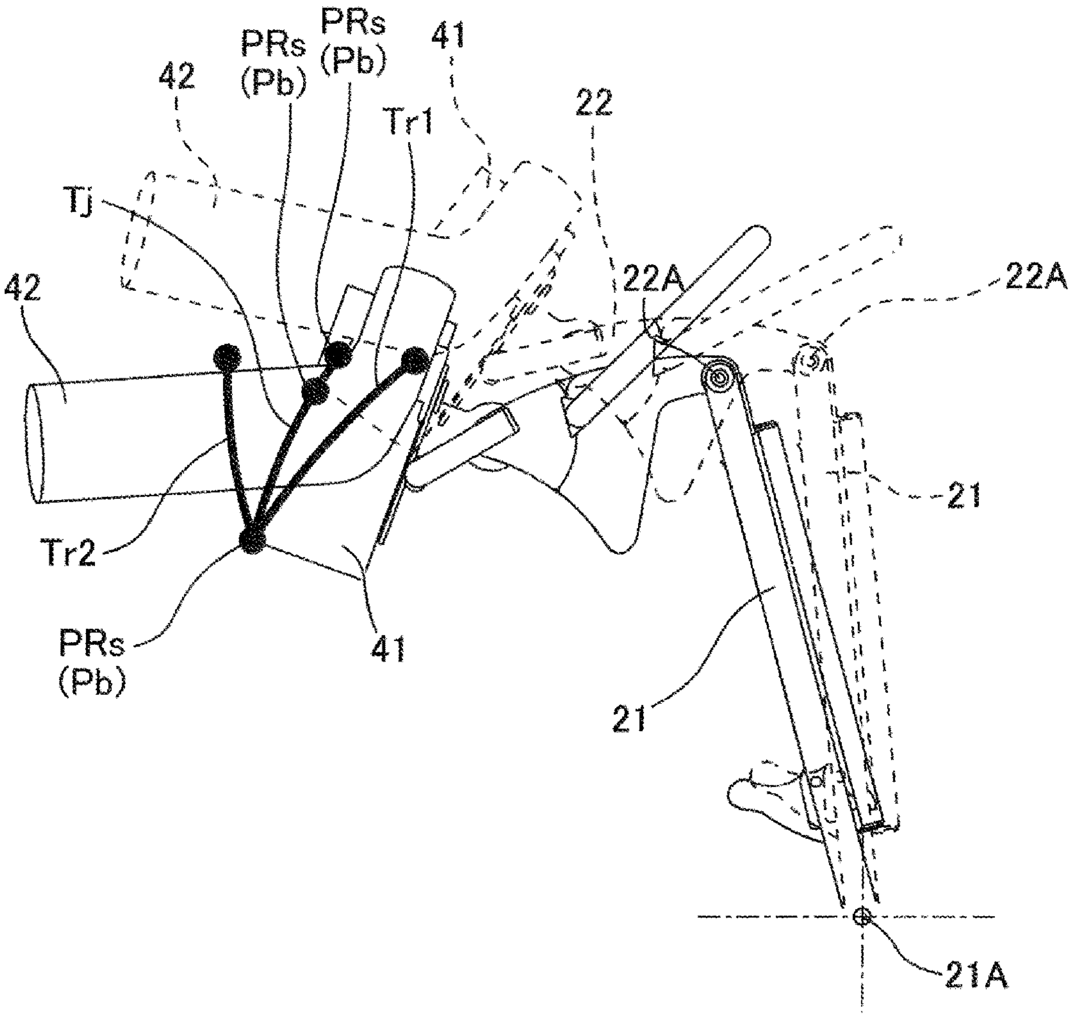

[Fig. 7]
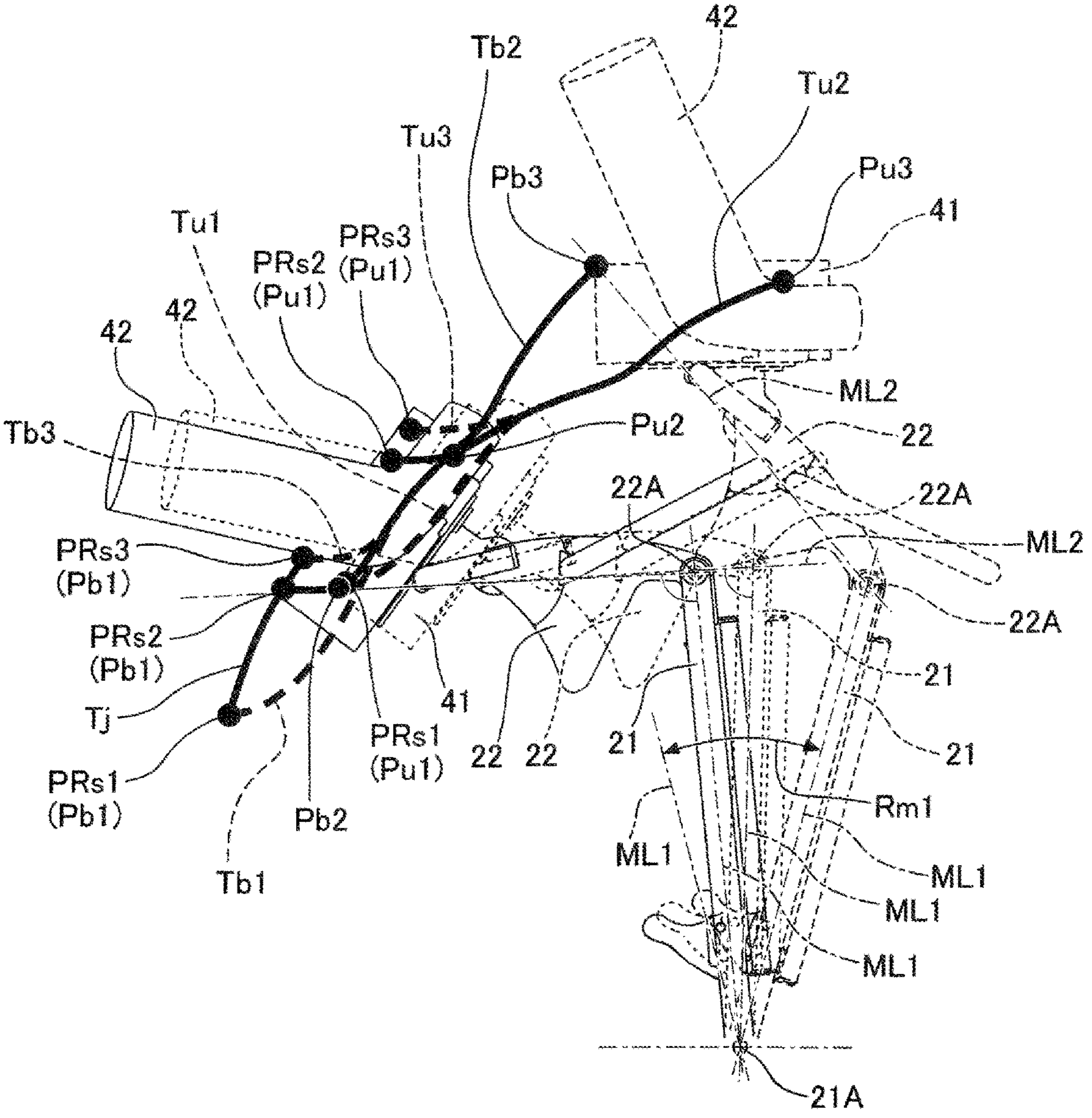

[Fig. 8]
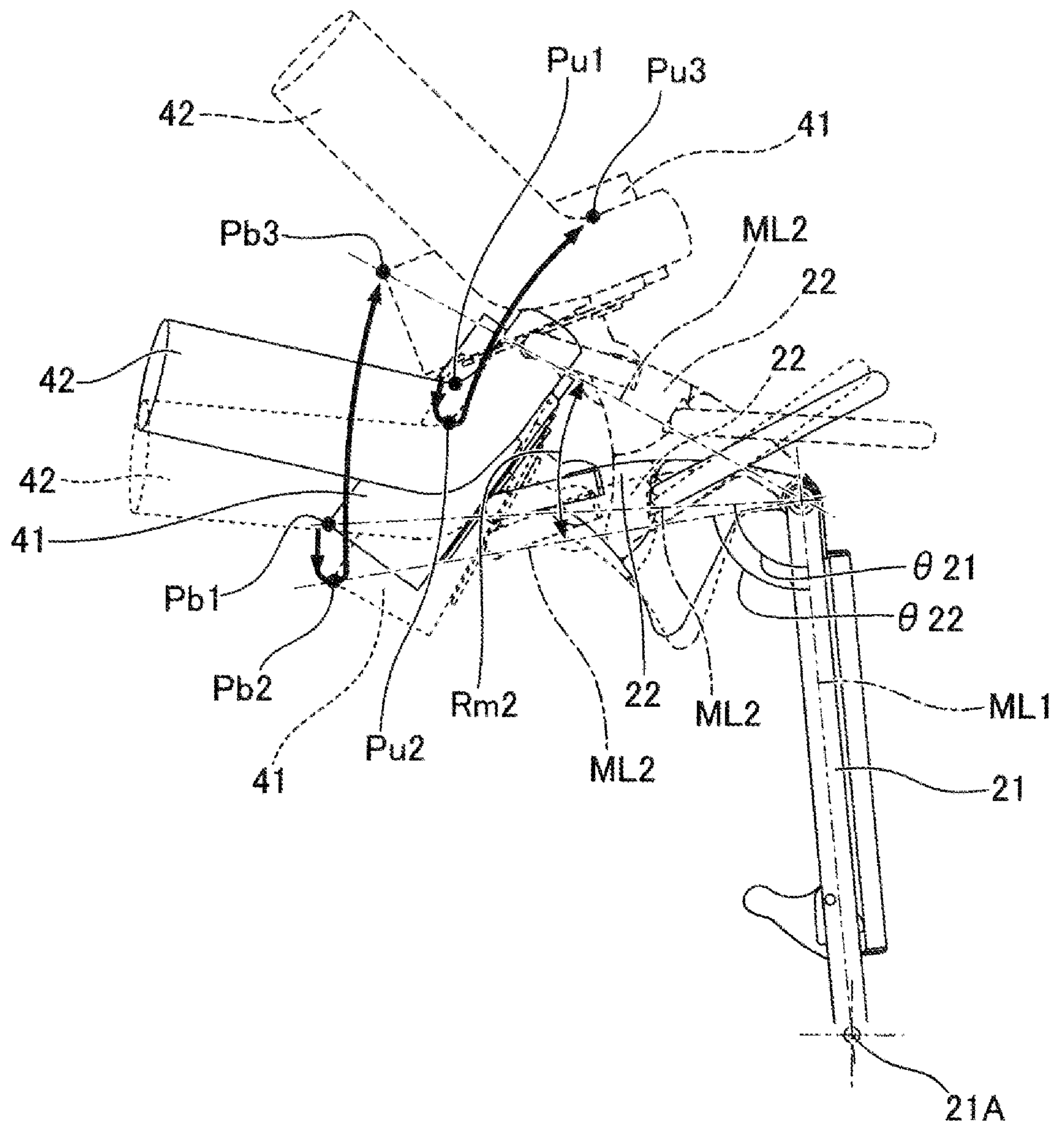

CARING DEVICE

CROSS-REFERENCE TO RELATED APPLICATION

This application is a 371 application of the International PCT application serial no. PCT/JP2019/016065, filed on Apr. 12, 2019. The entirety of the above-mentioned patent application is hereby incorporated by reference herein and made a part of this specification.

TECHNICAL FIELD

The present invention relates to a caring device.

BACKGROUND

Patent Literature 1 and Patent Literature 2 disclose caring devices that assist a standing operation of a cared person. The caring device of Patent Literature 1 is provided with a driving device including a rotating device that tilts a support member that supports the cared person, and a linear motion device that lifts and lowers the support member and the rotating device. The caring device of Patent Literature 2 is provided with a driving device including three rotating devices that enable the support member to be moved to an arbitrary position and angle.

PATENT LITERATURE

Patent Literature 1: International Publication No. WO2018/116472

Patent Literature 2: JP-A-2011-019571

SUMMARY

Technical Problem

There is a demand for the caring device to simplify the driving device from the viewpoint of downsizing and manufacturing cost while allowing the support member that assists the standing operation of the cared person to move. In addition, the caring device is required to have a function of adjusting the position of the support member in the up-down direction in accordance with, for example, a physique of the cared person and a height of a seat surface in an initial state before the cared person boards. Furthermore, the caring device is required to move the support member in accordance with the adjusted height of the support member in assisting the standing operation.

It is an object of the present specification to provide a caring device capable of adjusting the position of the support member in the up-down direction in the initial state while enabling downsizing and reduction of manufacturing cost by simplifying the configuration, and moving the support member in accordance with the height of the support member adjusted in assisting the standing operation.

Solution to Problem

The present specification discloses a caring device configured to assist a standing operation of a cared person, the device including a base; a first arm provided on the base and configured to revolve around a horizontal first center axis; a second arm provided on the first arm and configured to revolve around a horizontal second center axis; a support member provided on the second arm and configured to support an upper half body of the cared person; an adjustment command section configured to give a command for an adjustment of a standing start position of the support member; a standing operation command section configured to give a command for assistance of the standing operation using the support member; and a control device configured to perform a cooperative operation of the first arm and the second arm so that the support member moves in an up-down direction when a command of the adjustment command section is received, and to perform a cooperative operation of the first arm and the second arm so that a reference position of the support member moves along different movement trajectories in accordance with the standing start position adjusted by the command of the adjustment command section when a command of the standing operation command section is received.

Advantageous Effect of the Invention

With such a configuration, the support member can be moved along a predetermined movement trajectory by the first arm and the second arm constituting the mechanism including two joints with respect to the base. As a result, the caring device can move the support member in the up-down direction in accordance with the adjustment command, and adjust the standing start position. Furthermore, the caring device moves the movement trajectory of the support member along different movement trajectories in accordance with the adjusted standing start position. As a result, cared person M can be shifted from the sitting posture to the standing posture with a more natural motion.

BRIEF DESCRIPTION OF THE DRAWINGS

FIG. 1 is a perspective view of a caring device of an embodiment as viewed obliquely from a rear.

FIG. 2 is a side view illustrating the caring device in an initial state that supports a cared person in a sitting posture.

FIG. 3 is a side view illustrating the caring device that supports the cared person in an intermediate posture.

FIG. 4 is a side view illustrating the caring device in a standing support state where it supports the cared person in a standing posture.

FIG. 5 is a block diagram illustrating a controller and a control device of the caring device.

FIG. 6 is a diagram illustrating operations of a first arm, a second arm, and a support member in an adjusting operation, as well as a movement trajectory of a lower reference position and a movement trajectory of an upper reference position.

FIG. 7 is a diagram illustrating operations of the first arm, the second arm, and the support member in assisting an operation of a standing operation, as well as the movement trajectory of the lower reference position and the movement trajectory of the upper reference position.

FIG. 8 is a diagram illustrating an operation of the second arm and a movable range of the second arm in assisting the operation of the standing operation.

DESCRIPTION OF THE EMBODIMENTS

1. Configuration of Caring Device 1

A configuration of caring device 1 of the embodiment will be described with reference to FIGS. 1 to 4. Caring device 1 assists cared person M (refer to FIG. 2 or the like) in a standing operation from a sitting posture to a standing posture, and in a sitting operation from the standing posture to the sitting posture. When caring device 1 supports an upper half body of cared person M in the standing posture, one caring person can pull caring device 1 or the like to move caring device 1 to, for example, a moving target in a caring facility.

The “standing posture” means a posture in which a lower half body of cared person M is standing. As illustrated in FIG. 4, in the present specification, a posture in which buttocks Mt is lifted from the sitting posture, the lower half body stands, and the upper half body is tilted forward is defined as a standing posture of cared person M. That is, assistance for the standing operation is assistance for an operation in which the posture is such that buttocks Mt of cared person M is lifted, and the upper half body is tilted forward to place the mass of the upper half body in caring device 1. In addition, the assistance for the sitting operation is assistance for an operation of lowering the position of buttocks Mt of cared person M.

As illustrated in FIG. 1, caring device 1 is provided with base 10. More specifically, base 10 includes frame 11 forming a main body of base 10. In the present embodiment, base 10 includes foot placing table 12 provided so as to be horizontal to frame 11. Both legs Mg of cared person M are placed on foot placing table 12. Caring device 1 may adopt an aspect in which foot placing table 12 is not provided depending on the level of caring required by cared person M. Base 10 includes first actuator support portion 13 provided upward closer on a front side of an upper surface of foot placing table 12.

Three wheels 16 to 18 are each provided on the left and right sides on the lower side of foot placing table 12. Each of wheels 16 to 18 has a steering function for changing the movement direction. Foremost wheel 16 has a locking function for restricting movement. Caring device 1 is capable of not only moving and changing the direction in the front-rear direction, but also laterally moving (moving in the true lateral direction) and spin turn (revolving on the spot) by the steering function of six wheels 16 to 18.

Caring device 1 is provided with knee pad member 80. Knee pad member 80 is a member provided on base 10 and on which the knee of cared person M assisted in the standing operation abuts. Knee pad member 80 is provided to stabilize the standing operation or the sitting operation of cared person M by determining the position of the knee of cared person M. Knee pad member 80 includes support rod 81, buffer member 82, and position adjustment portion 83. Support rod 81 is formed in an L-shape and supports buffer member 82.

Buffer member 82 is a cushion material provided on support rod 81 and extending in the right-left direction. Buffer member 82 is covered with, for example, a protective cover made of cloth or leather. Position adjustment portion 83 slidably supports support rod 81 in the front-rear direction. Position adjustment portion 83 is configured to be able to adjust the position of buffer member 82 in the front-rear direction so as to be compatible with a physique and the sitting posture of cared person M. After the positional adjustment using position adjustment portion 83, the positions of support rod 81 and buffer member 82 in the front-rear direction are set by positioning pins (not illustrated).

Caring device 1 is provided with first arm 21 and second arm 22. As illustrated in FIG. 2, first arm 21 is provided on base 10 and revolves around horizontal first center axis 21A. Second arm 22 is provided on first arm 21 and revolves around horizontal second center axis 22A. In the present embodiment, as illustrated in FIG. 2, first arm 21 is formed so as to extend upward from first center axis 21A in an initial state before the cared person is boarded. In addition, second arm 22 is formed so as to extend rearward from second center axis 22A in the initial state.

As described above, first arm 21 and second arm 22 constitute an operation mechanism including two joints with respect to base 10. First arm 21 and second arm 22 support support member 40 that supports the upper half body of cared person M so as to be movable in the up-down direction and the front-rear direction of base 10. In addition, first arm 21 includes two second actuator support portions 25 provided rearward from a lower side of a center portion in the up-down direction and disposed side by side in the extension direction of first arm 21 with each other and third actuator support portion 26. In addition, second arm 22 includes fourth actuator support portion 27 protruding downward from a center portion in the right-left direction and provided downward. Detailed configurations of first arm 21 and second arm 22 will be described later.

Caring device 1 is provided with driving device 30 that causes first arm 21 and second arm 22 to revolve in operation processing for assisting the standing operation of cared person M supported by support member 40. In the present embodiment, driving device 30 is provided with first actuator 31 and second actuator 32. First actuator 31 and second actuator 32 are telescopic actuators.

More specifically, first actuator 31 includes main body portion 31*a* and movable portion 31*b*. Main body portion 31*a* is formed in a cylindrical shape having an open end portion. Movable portion 31*b* is formed in a columnar shape having a smaller diameter than that of main body portion 31*a*, and a first end thereof is inserted from the opening of main body portion 31*a*. First actuator 31 moves movable portion 31*b* in the extension direction with respect to main body portion 31*a* by a driving force of a motor (not illustrated).

In addition, since second actuator 32 is the same type as first actuator 31, detailed descriptions thereof will be omitted. Main body portion 32*a* and movable portion 32*b* of second actuator 32 correspond to main body portion 31*a* and movable portion 31*b* of first actuator 31. First actuator 31 and second actuator 32 can use different types of drive sources such as a pressure driving source using hydraulic pressure or pneumatic pressure instead of the above motor.

Here, first actuator 31 and second actuator 32 are provided behind first arm 21. In addition, first actuator 31 is provided so as to be tilted forward from base 10 side toward first arm 21 side. Specifically, first actuator 31 is provided so as to be rotatable at a first end on main body portion 31*a* side to first actuator support portion 13 of base 10, and is provided so as to be rotatable at a second end on movable portion 31*b* side to second actuator support portion 25 of first arm 21.

In addition, second actuator 32 is provided above first actuator 31 and tilted rearward from first arm 21 side toward second arm 22 side. Specifically, second actuator 32 is provided so as to be rotatable at a first end on movable portion 32*b* side to third actuator support portion 26 of first arm 21, and is provided so as to be rotatable at a second end on main body portion 32*a* side to fourth actuator support portion 27 of second arm 22.

With the configuration as described above, driving device 30 causes first arm 21 to revolve forward around first center axis 21A by an extension operation of first actuator 31, and causes first arm 21 to revolve rearward by a shortening operation of first actuator 31. In addition, driving device 30 causes second arm 22 to revolve forward around second center axis 22A by the extension operation of second actuator 32, and causes second arm 22 to revolve rearward by the shortening operation of second actuator 32. In driving device 30, the operations of first actuator 31 and second actuator 32 are controlled by control device 70.

In addition, as described above, both first actuator 31 and second actuator 32 are configured to be provided behind first arm 21. As a result, first and second actuators 31 and 32 are housed on the rear side where base 10 and second arm 22 are disposed with respect to first arm 21, so that entire caring device 1 is compact in the front-rear direction. Furthermore, by providing first actuator 31 and second actuator 32 so as to be tilted forward or rearward as described above, it is possible to ensure a space for cared person M to board behind first arm 21 and below second arm 22.

Caring device 1 is provided with support member 40 that supports the upper half body of cared person M. Support member 40 is provided on second arm 22. In the present embodiment, support member 40 is provided with trunk support portion 41 and a pair of side support portions 42. Trunk support portion 41 is formed in a planar shape close to the trunk shape of cared person M. Trunk support portion 41 is formed of a material that can be flexibly deformed. The support surface of trunk support portion 41 is in surface contact with a front surface of the trunk of the upper half body of cared person M to support the trunk. More specifically, the support surface of trunk support portion 41 supports a range extending from chest Mb to abdomen Ma of cared person M. Trunk support portion 41 is attached to a rear end portion of second arm 22.

In addition, trunk support portion 41 is supported so as to be able to freely tilt in the front-rear direction with respect to second arm 22. Specifically, trunk support portion 41 is configured to be able to tilt within a predetermined angle range in the clockwise direction in FIG. 2 from the state illustrated in FIG. 2. The above "free tilt" means a tilt that can be manually moved, not a tilt driven by an actuator or the like.

The pair of side support portions 42 is supported by trunk support portion 41 and supports the side of cared person M. More specifically, the pair of side support portions 42 are provided on the right and left sides of trunk support portion 41. Side support portion 42 is swingably supported by trunk support portion 41. Side support portion 42 is formed in an L-shape by a rod-like member. The surface of side support portions 42 is covered by a material that can be flexibly deformed.

Caring device 1 is provided with first handle 51 and second handle 52. First handle 51 is formed in a substantially rectangular frame shape. First handle 51 is formed so as to extend forward and upward from the rear end portion of second arm 22. Side portions of first handle 51 are gripped by both hands of cared person M. Furthermore, the side portion and the front portion of first handle 51 are gripped by the caring person to move caring device 1.

Second handle 52 is integrally provided on a front surface of trunk support portion 41. Second handle 52 is formed in an elongated U-shape. Second handle 52 is provided with a base shaft portion fixed to a lower portion of trunk support portion 41 and extending in the right-left direction, and a gripping portion extending from both ends of the base shaft portion toward first handle 51 side.

Caring device 1 is provided with controller 60 that receives an operation of cared person M or the caring person. As illustrated in FIG. 5, controller 60 is provided with up button 61, down button 62, standing button 63, and sitting button 64. Up button 61 and down button 62 receive a request for adjusting the position of support member 40 in the up-down direction. Standing button 63 receives an assistance request for the standing operation. Sitting button 64 receives an assistance request for the sitting operation.

Caring device 1 is provided with control device 70 that controls driving device 30 and moves support member 40 supporting cared person M. Control device 70 performs a cooperative operation of first arm 21 and second arm 22 in assisting the standing operation or the sitting operation of cared person M. Here, the above "cooperative operation" means that a first arm of first arm 21 and second arm 22 operates in accordance with the state of a second arm. Accordingly, the operation in which the revolving of first arm 21 and the revolving of second arm 22 cooperate with each other includes a state where both first arm 21 and second arm 22 are revolved, and a state where only one of first arm 21 and second arm 22 is revolved.

As illustrated in FIG. 5, control device 70 is provided with adjustment command section 71 and standing operation command section 72. Adjustment command section 71 gives a command for the adjustment of standing start position PRs of support member 40. Adjustment command section 71 gives a command for the adjustment of standing start position PRs, for example, in a case where up button 61 or down button 62 of controller 60 is pressed and controller 60 receives the adjustment request.

Standing operation command section 72 gives a command for assistance of the standing operation using support member 40. Standing operation command section 72 gives a command for the assistance of the standing operation, for example, in a case where standing button 63 of controller 60 is pressed and controller 60 receives the assistance request for the standing operation. In the present embodiment, caring device 1 receives the adjustment request and the assistance request by controller 60 having various buttons 61 to 64, and may also receive the adjustment request or the assistance request via a pedal for receiving the foot operation of the caring person or a microphone for inputting sound of the caring person or the like.

When instructed to adjust standing start position PRs and assist the standing operation, control device 70 controls driving device 30 so that the revolving of first arm 21 and the revolving of second arm 22 cooperate with each other. Here, the above "standing start position PRs" is a reference position in support member 40 when control device 70 is instructed to assist the standing operation, and corresponds to a reference position in support member 40 when the adjustment is ended in a case where the position of support member 40 in the up-down direction is adjusted in the initial state of caring device 1.

Control device 70 performs the cooperative operation of first arm 21 and second arm 22 so that support member 40 moves in the up-down direction when the command of adjustment command section 71 is received. Specifically, when adjusting standing start position PRs, control device 70 causes support member 40 to be lifted or lowered by causing both first arm 21 and second arm 22 to revolve forward or rearward. That is, control device 70 causes both first arm 21 and second arm 22 to revolve forward when support member 40 is lifted. On the other hand, control device 70 causes both first arm 21 and second arm 22 to revolve rearward when support member 40 is lowered.

In addition, in a case where the adjustment of standing start position PRs is instructed by the standing operation command section 72, control device 70 determines whether the adjustment of standing start position PRs is executable based on the operation state of caring device 1. Specifically, control device 70 sets in advance an adjustable range of the position of support member 40 in the up-down direction. The above adjustable range is set, for example, in accordance with movable range Rm1 of first arm 21, movable range Rm2 of second arm 22, and the height and angle range of support member 40 suitable for a boarding posture.

In addition, when receiving a command of standing operation command section 72, control device 70 performs the cooperative operation of first arm 21 and second arm 22 so that the reference position of support member 40 moves along different movement trajectories in accordance with standing start position PRs adjusted by the command of adjustment command section 71. Specifically, as illustrated in FIG. 7, control device 70 moves support member 40 along first movement trajectories Tb1 to Tb3 and second movement trajectories Tu1 to Tu3 corresponding to various standing start positions PRs1 to PRs3. In the present embodiment, control device 70 moves support member 40 so as to have substantially the same position and angle when ending a first process described later regardless of first movement trajectories Tb1 to Tb3 and second movement trajectories Tu1 to Tu3.

As described above, control device 70 causes both first arm 21 and second arm 22 to revolve forward or rearward when adjusting standing start position PRs. On the other hand, when assisting the standing operation of cared person M, control device 70 executes the first process of causing first arm 21 to revolve forward and second arm 22 to revolve rearward to shift cared person M to the intermediate posture between the sitting posture and the standing posture. Details of the operation processing of the standing operation by caring device 1 will be described later.

In the present embodiment, controller 60 is assumed to have an operation request (adjustment request or assistance request) only during a period when any of buttons 61 to 64 is pressed. In addition, in a case where there is an operation request, control device 70 may not execute an operation corresponding to the request depending on the operation state of caring device 1. This is assumed to be, for example, a case where the posture of cared person M is inappropriate for the movement of support member 40 in accordance with the request, or a case where the movement of support member 40 reaches the boundary of the movable range. As an example, as described above, there is a case where control device 70 rejects to execute the adjustment of standing start position PRs.

2. Detailed Configurations of First Arm 21 and Second Arm 22

Detailed configurations of first arm 21 and second arm 22 of caring device 1 configured as described above will be described with reference to FIGS. 2, 4, and 6 to 8. Here, the state before the execution of the operation processing for assisting the standing operation of cared person M is defined as an initial state of caring device 1 (refer to FIG. 2). In the initial state of caring device 1, the position of support member 40 in the up-down direction is adjusted in accordance with, for example, the physique of cared person M or the height of seat surface 91 of chair 90. In addition, a state where trunk support portion 41 of support member 40 supports the trunk of cared person M in the standing posture from below is defined as a standing support state (refer to FIG. 4).

As described above, first arm 21 is provided on base 10 so as to be revolvable around first center axis 21A. In the present embodiment, first arm 21 is formed in a linear shape along first virtual line ML1 passing through first center axis 21A and second center axis 22A so as to extend upward from first center axis 21A in the initial state of caring device 1. In addition, second arm 22 is formed so as to extend rearward from second center axis 22A in the initial state of caring device 1.

Here, as illustrated in FIG. 2, first center axis 21A is set to be located in the vicinity of an attaching position of front wheel 16 in the front-rear direction, and to be located between base 10 and knee pad member 80 in the up-down direction. Specifically, first center axis 21A is located at a position lower than knee bending position PKb of the cared person. In addition, second center axis 22A is located behind first center axis 21A in the initial state of caring device 1. That is, the extension direction of first arm 21 is tilted rearward with respect to a vertical axis in the initial state.

Furthermore, second center axis 22A is located ahead of knee bending position PKb at which upper thigh portion Mh and lower thigh portion Me of cared person M are bent in the initial state of caring device 1. More specifically, in the present embodiment, as illustrated in FIG. 2, the above "knee bending position PKb" is an intersection point of upper thigh virtual line NL1 that passes through the center portion of upper thigh portion Mh of cared person M and extends in the extension direction of upper thigh portion Mh, and lower thigh virtual line NL2 that passes through the center portion of lower thigh portion Me of cared person M and extends in the extension direction of lower thigh portion Me when starting the assistance of the standing operation. As described above, first arm 21 is configured so that second center axis 22A is located ahead of knee bending position PKb of cared person M while tilting rearward in the initial state of caring device 1.

Second center axis 22A may be located directly above knee pad member 80 or ahead of knee pad member 80 in the initial state of caring device 1. In addition, as illustrated in FIGS. 4 and 7, second center axis 22A may be located ahead of a front end of a portion of trunk support portion 41 in contact with the trunk in the standing support state where trunk support portion 41 supports the trunk of cared person M in the standing posture. First arm 21 and second arm 22 are configured to have a positional relationship between first center axis 21A and second center axis 22A as described above, respectively. Supplementally, first arm 21 extends from first center axis 21A to a height at which chest Mb of cared person M is located, and is tilted rearward in the initial state of caring device 1.

In the initial state of caring device 1, second arm 22 ensures the length in the horizontal direction from second center axis 22A to the front surface of support member 40 in contact with chest Mb of cared person M. In addition, second arm 22 is configured to extend obliquely rearward from second center axis 22A to a connecting portion with support member 40 in the standing support state of caring device 1.

As described above, by ensuring a predetermined length of second arm 22, a sufficient space can be formed between both legs Mg and first arm 21 in a posture in which cared person M contacts the chest with support member 40. As a result, it is possible to prevent the interference between the members other than knee pad member 80 and both legs Mg of cared person M while ensuring a range in which the position of knee pad member 80 can be adjusted. In addition, by ensuring the length of the second arm, it is easy to ensure the amount of movement of support member 40 in the up-down direction while reducing the amount of movement of support member 40 in the front-rear direction, in the adjustment of standing start position PRs accompanied by the revolving of second arm 22. Furthermore, as illustrated in FIG. 4, by ensuring the length of second arm 22, it is possible to lift support member 40 to a sufficient height as well as first arm 21 in the standing support state.

As illustrated in FIG. 7, movable range Rm1 of first arm 21 may include an angle at which first virtual line ML 1 passing through first center axis 21A and second center axis 22A is in the vertical direction. In the present embodiment, movable range Rm1 of first arm 21 is set to a range in which first virtual line ML1 can revolve back and forth by 25 degrees with respect to an angle coincident with a vertical axis.

In addition, as illustrated in FIG. 8, movable range Rm2 of second arm 22 may include an angle at which second virtual line ML2 passing through second center axis 22A and the reference position set in support member 40 is in the horizontal direction. In the present embodiment, movable range Rm2 of second arm 22 is set to a range in which second virtual line ML2 can revolve up and down by 25 degrees with respect to an angle coincident with a horizontal axis.

As illustrated in FIG. 2, lower reference position Pb and upper reference position Pu may be set in the above reference position. Lower reference position Pb is set at a lower end of a portion of trunk support portion 41 in contact with the trunk. In addition, as illustrated in FIG. 2, upper reference position Pu is set at an upper end of a portion of trunk support portion 41 in contact with the trunk. Upper reference position Pu may be set at a position of the side of cared person M.

Here, in the adjustment processing of standing start position PRs and the operation processing of the standing operation, when the revolving of first arm 21 and the revolving of second arm 22 cooperate with each other, swinging support member 40 may have a portion that advances and a portion that retreats with respect to base 10, and similarly, may have a portion that is lifted and a portion that is lowered with respect to base 10. Therefore, in the following, the movement of the reference position set to the position that is integrally moved with support member 40 will be described as the movement of support member 40. As described above, lower reference position Pb and upper reference position Pu can be set in the above reference position.

3. Adjustment Processing of Standing Start Position PRs by Caring Device 1

The adjustment processing of standing start position PRs by caring device 1 will be described with reference to FIGS. 5 and 6. The above adjustment processing of standing start position PRs is executed, for example, when up button 61 or down button 62 of controller 60 is pressed, and the adjustment of standing start position PRs of support member 40 is instructed and executed by adjustment command section 71. Here, it is assumed that control device 70 permits the execution of the adjustment of standing start position PRs based on the operation state of caring device 1.

In the adjustment processing of standing start position PRs, control device 70 drives first actuator 31 and second actuator 32 to extend in a case where support member 40 is lifted. As a result, first arm 21 revolves forward around first center axis 21A, and second arm 22 revolves forward around second center axis 22A in cooperation with first arm 21. During the execution of the adjustment processing as described above, standing start position PRs moves upward along adjustment movement trajectory Tj, as illustrated in FIG. 6.

FIG. 6 illustrates first reference trajectory Tr1 and second reference trajectory Tr2 to be compared with above adjustment movement trajectory Tj in a case where standing start position PRs is set to lower reference position Pb. First reference trajectory Tr1 is a movement trajectory when the revolving of second arm 22 is stopped and the adjustment of standing start position PRs is attempted only by the revolving of first arm 21. Second reference trajectory Tr2 is a movement trajectory when the revolving of first arm 21 is stopped and the adjustment of standing start position PRs is attempted only by the revolving of second arm 22.

Adjustment movement trajectory Tj can ensure a sufficient adjustable range in the up-down direction while reducing the amount of movement in the front-rear direction than first reference trajectory Tr1. In addition, although the amount of movement of adjustment movement trajectory Tj in the front-rear direction is larger than that of second reference trajectory Tr2, the amount of tilting of support member 40 before and after the movement within the adjustable range can be reduced. In addition, whereas second reference trajectory Tr2 has a portion that moves rearward and a portion that moves forward in the adjustable range, adjustment movement trajectory Tj can monotonously move forward support member 40, for example, when support member 40 is lifted.

In a case where support member 40 is lowered, control device 70 drives first actuator 31 and second actuator 32 to shorten. As a result, first arm 21 revolves rearward around first center axis 21A, and second arm 22 revolves rearward around second center axis 22A in cooperation with first arm 21. As a result, standing start position PRs moves downward along adjustment movement trajectory Tj. In a case where standing start position PRs reaches the upper end or the lower end of the adjustable range, control device 70 rejects the adjustment request for the lifting side or the adjustment request for the lowering side, and stops the operation of driving device 30.

4. Operation Processing of Standing Operation by Caring Device 1

Operation processing for assisting the standing operation by caring device 1 will be described with reference to FIGS. 2 to 4 and 7. The above operation processing of the standing operation includes a first process of moving forward support member 40 and a second process of moving forward and lifting support member 40. The first process and the second process of the operation processing are actually executed in series, and in a case where support member 40 follows a smooth movement trajectory, it is not always possible to feel the switching of processes.

In the present embodiment, a process of advancing support member 40 so that the mass of the upper half body of cared person M is substantially placed on support member 40 is referred to as a first process. The first process includes an operation of revolving rearward second arm 22 in parallel with revolving forward first arm 21 at an initial stage of the standing operation. By executing the first process, cared person M shifts from the sitting posture, which is the initial state illustrated in FIG. 2, to the intermediate posture in which the upper half body illustrated in FIG. 3 is tilted forward. In addition, a process of advancing and lifting support member 40 so as to lift the upper half body of cared person M is referred to as a second process. At this time, cared person M shifts from the intermediate posture illustrated in FIG. 3 to the standing posture in which both legs Mg is extended, which is the end state illustrated in FIG. 4.

As illustrated in FIG. 2, at the initial stage of the operation processing for assisting the standing operation, cared person M is in a seated state (state of the sitting posture) in which buttocks Mt is in contact with seat surface 91 of chair 90. Caring device 1 is placed in the initial state of operation processing for assisting the standing operation by an operation by cared person M or the caring person. The above operation includes the positional adjustment of caring device 1 with respect to cared person M, and the height adjustment of support member 40 (adjustment of standing start position PRs) in accordance with the physique or the like of cared person M.

In the initial state of caring device 1, cared person M places both legs on foot placing table 12. At this time, cared person M causes the front surface of the trunk to be in surface contact with trunk support portion 41. In addition, cared person M causes the knee to come into contact with the rear surface of knee pad member 80. Furthermore, cared person M grips first handle 51. At this time, depending on the physique of cared person M, a certain gap may occur between the side of cared person M and side support portion 42. As described above, in the initial state where preparation for the boarding in caring device 1 is finished, cared person M is placed in a posture in which the upper half body is tilted forward to some extent, as illustrated in FIG. 2.

Subsequently, when cared person M or the caring person presses standing button 63 of controller 60 to input the assistance request for the standing operation, control device 70 executes the first process of changing cared person M from the initial sitting posture to the intermediate posture in which the upper half body is tilted forward. Specifically, in the first process, control device 70 causes first arm 21 to revolve forward and causes second arm 22 to revolve rearward. As a result, control device 70 advances support member 40 with respect to base 10, and maintains or lowers the height of support member 40 with respect to base 10.

Control device 70 causes first arm 21 to revolve forward and causes second arm 22 to revolve rearward until first arm 21 reaches a predetermined angle. At this time, for example, in a case where second arm 22 reaches a rear revolving end of movable range Rm2 before first arm 21 reaches the predetermined angle, control device 70 causes first arm 21 to revolve forward in a state where the revolving of second arm 22 around second center axis 22A is stopped. In addition, in a case where first arm 21 reaches the predetermined angle, control device 70 determines that cared person M is shifted to the intermediate posture, and ends the first process. As described above, the operation of bending a waist portion so as to shift from the sitting posture to the intermediate posture as the first stage of the standing operation is a natural operation close to the operation in which cared person M places weight on support member 40 while bending the waist portion by himself.

Subsequently, the operation processing of the standing operation is continued, and control device 70 executes the second process of causing both first arm 21 and second arm 22 to revolve forward to change cared person M from the intermediate posture to the standing posture. Specifically, control device 70 continues the forward revolving of first arm 21, and switches the operation of second arm 22 from the rearward revolving or the stopped state to the forward revolving.

Control device 70 maintains the forward revolving of first arm 21 until first arm 21 reaches the front revolving end of movable range Rm1, and maintains the forward revolving of second arm 22 until second arm 22 reaches the front revolving end of movable range Rm2. By the control as described above, in the second process, cared person M supported by support member 40 is changed in a standing posture (refer to FIG. 4) in which both legs Mg of cared person M are extended from the intermediate posture (refer to FIG. 3).

In the operation processing of the standing operation as described above, control device 70 performs the cooperative operation of first arm 21 and second arm 22 so that lower reference position Tb of support member 40 moves along different movement trajectories in accordance with standing start position PRs adjusted in advance. Specifically, as illustrated in FIG. 5, in a case where standing start position PRs is adjusted to three types of standing start positions PRs1 to PRs3, control device 70 moves support member 40 so that lower reference position Pb follows the three types of first movement trajectories Tb1 to Tb3 corresponding to these positions.

Simultaneously, control device 70 moves support member 40 so that upper reference position Pu follows three types of second movement trajectories Tu1 to Tu3 corresponding to the three types of standing start positions PRs1 to PRs3. In the present embodiment, control device 70 moves support member 40 so that support member 40 has substantially the same position and angle when ending the first process, even when support member 40 is moved by any movement trajectory. However, the position and the angle of support member 40 when ending the first process, that is, when starting the second process, may change depending on adjusted standing start position PRs, the predetermined angle of first arm 21 in the first process, the movable ranges of each of arms 21 and 22, and the like.

The position reached by lower reference position Pb when ending the second process may appropriately change on first movement trajectory Tb. For example, in a case where the assistance request is no longer inputted to caring device 1, control device 70 ends the operation processing of the standing operation. Therefore, depending on lower reference position Pb when ending, cared person M in the standing posture may be in a state where, for example, the knee is not in contact with knee pad member 80 in addition to the posture illustrated in FIG. 4. This also applies to upper reference position Pu.

5. Effects by Configuration of Embodiment

Control device 70 of caring device 1 of the embodiment performs the cooperative operation of first arm 21 and second arm 22 so that support member 40 moves in the up-down direction when a command of adjustment command section 71 is received. In addition, control device 70 performs the cooperative operation of first arm 21 and second arm 22 so that the reference position of support member 40 moves along different movement trajectories Tb and Tu in accordance with the standing start position adjusted by the command of adjustment command section 71, when a command of standing operation command section 72 is received.

With the above configuration, support member 40 can be moved along predetermined movement trajectories Td and Tu by first arm 21 and second arm 22 constituting the mechanism having two joints with respect to base 10. As a result, caring device 1 can move support member 40 in the up-down direction in accordance with the adjustment command to adjust standing start position PRs. Furthermore, caring device 1 moves support member 40 along different movement trajectories Tb and Tu in accordance with adjusted standing start position PRs. As a result, cared person M can be shifted from the sitting posture to the standing posture with a more natural operation.

6. Modified Aspect of Embodiment

In the embodiment, the reference position is set at a lower end or an upper end of the portion of trunk support portion 41 in contact with the trunk of cared person M, or a position of a side of cared person M. On the other hand, the reference position can be set at an appropriate position when the reference position is set at a position moving integrally with support member 40. For example, the reference position may be set at the position of chest Mb of cared person M in a configuration in which support member 40 is provided with the trunk support portion as illustrated in the embodiment. In addition, the reference position may be set at a connecting portion between support member 40 and second arm 22. In such a configuration, the same effect as that of the embodiment is obtained.

In addition, the operation processing of the standing operation includes two processes of the first process and the second process executed in series. On the other hand, another process may be appropriately included in the operation processing of the standing operation. For example, the operation processing may include a preparation process for changing caring device 1 from a current state to an initial state, a recovery process in a case where each process once executed is stopped and then restarted, and the like. Control device 70 may be configured to control the movement of support member 40 by combining various processes and cooperating the revolving of first arm 21 and the revolving of second arm 22, based on these operation states of caring device 1 and the assistance request or the adjustment request to be inputted.

Although the first process and the second process are defined as described above in the embodiment, the processes may be classified by the angles of first arm 21 and second arm 22, the position of lower reference position Pb in first movement trajectory Tb, the position of upper reference position Pu in second movement trajectory Tu, the angle of support member 40, the posture of cared person M, or the like. In either classification, in the process of shifting from the sitting posture to the intermediate posture, the same effect as that of the embodiment can be obtained by revolving forward first arm 21 while revolving rearward second arm 22 (stopping in a case of reaching the rear revolving end of movable range Rm2).

REFERENCE SIGNS LIST

1: caring device, 10: base, 21: first arm, 22: second arm, 21A: first center axis, 22A: second center axis, 30: driving device, 31: first actuator, 32: second actuator, 40: support member, 41: trunk support portion, 42: side support portion, 60: controller, 61: up button, 62: down button, 63: standing button, 64: sitting button, 70: control device, 71: adjustment command section, 72: standing operation command section, 80: knee pad member, M: cared person, Mt: buttocks, Mg: both legs, Mh: upper thigh portion, Me: lower thigh portion, NL1: upper thigh virtual line, NL2: lower thigh virtual line, ML1: first virtual line, ML2: second virtual line, Rm1, Rm2: movable range, PKb: knee bending position, Pb, Pu: reference position, PRs: standing start position

What is claimed is:

1. A caring device configured to assist a standing operation of a cared person, the device comprising:

a base;

a first arm provided on the base and configured to revolve around a horizontal first center axis;

a second arm provided on the first arm and configured to revolve around a horizontal second center axis;

a support member provided on the second arm and configured to support an upper half body of the cared person;

an adjustment command section configured to give a command for an adjustment of a standing start position of the support member;

a standing operation command section configured to give a command for assistance of the standing operation using the support member;

a control device configured to perform a cooperative operation of the first arm and the second arm so that the support member moves in an up-down direction when a command of the adjustment command section is received, and to perform a cooperative operation of the first arm and the second arm so that a reference position of the support member moves along different movement trajectories in accordance with the standing start position adjusted by the command of the adjustment command section when a command of the standing operation command section is received;

a first actuator configured to be a telescopic actuator, a first end of which is provided on the base and a second end of which is provided on the first arm, and configured to cause the first arm to revolve forward around the first center axis by an extension operation, and a second actuator configured to be a telescopic actuator, a first end of which is provided on the first arm and a second end of which is provided on the second arm, and configured to cause the second arm to revolve forward around the second center axis by the extension operation.

2. The caring device according to claim 1, wherein the control device causes the support member to be lifted or lowered by revolving both the first arm and the second arm forward or rearward when the standing start position is adjusted.

3. The caring device according to claim 2, wherein the first arm extends upward from the first center axis in an initial state before the cared person is boarded, and the second arm extends rearward from the second center axis in the initial state.

4. The caring device according to claim 2, wherein a posture in which buttocks are lifted from a sitting posture, a lower half body stands, and the upper half body is tilted forward is defined as a standing posture of the cared person, the support member includes a trunk support portion formed in a planar shape and configured to support a trunk in surface contact with a front surface of the trunk of the upper half body of the cared person, the trunk support portion supports the trunk of the cared person in the standing posture, and the first arm is formed so that the second center axis is located ahead of a front end of a portion of the trunk support portion in contact with the trunk in a state where the trunk support portion supports the trunk of the cared person in the standing posture.

5. The caring device according to claim 1, wherein the first arm extends upward from the first center axis in an initial state before the cared person is boarded, and the second arm extends rearward from the second center axis in the initial state.

6. The caring device according to claim 5, wherein a movable range of the first arm includes an angle at which a first virtual line passing through the first center axis and the second center axis is in a vertical direction, and a movable range of the second arm includes an angle at which a second virtual line passing through the second center axis and the reference position is in a horizontal direction.

7. The caring device according to claim 6, wherein the first arm is formed in a linear shape along the first virtual line so as to extend upward from the first center axis.

8. The caring device according to claim 1, wherein the first actuator and the second actuator are provided behind the first arm.

9. The caring device according to claim 8, wherein the first actuator is provided so as to be tilted forward from the base side toward the first arm side, and the second actuator is provided above the first actuator and is provided so as to be tilted rearward from the first arm side toward the second arm side.

10. The caring device according to claim 1, wherein a posture in which buttocks are lifted from a sitting posture, a lower half body stands, and the upper half body is tilted forward is defined as a standing posture of the cared person, the support member includes a trunk support portion formed in a planar shape and configured to support a trunk in surface contact with a front surface of the trunk of the upper half body of the cared person, the trunk support portion supports the trunk of the cared person in the standing posture, and the first arm is formed so that the second center axis is located ahead of a front end of a portion of the trunk support portion in contact with the trunk in a state where the trunk support portion supports the trunk of the cared person in the standing posture.

11. The caring device according to claim 1, further comprising:

a knee pad member provided on the base and on which a knee of the cared person assisted in the standing operation abuts, wherein the first arm is disposed so that the first center axis is located between the base and the knee pad member in the up-down direction, and is disposed so that the second center axis is located directly above the knee pad member or ahead of the knee pad member in an initial state before the cared person is boarded.

12. The caring device according to claim 1, further comprising:

a controller configured to receive an assistance request for the standing operation and an adjustment request for a position of the support member in the up-down direction, wherein the adjustment command section gives a command for the adjustment of the standing start position in a case where the controller receives the adjustment request, and the standing operation command section gives a command for the assistance of the standing operation in a case where the controller receives the assistance request for the standing operation.

13. The caring device according to claim 1, wherein the control device determines whether the adjustment of the standing start position is executable based on an operation state of the caring device in a case where the adjustment of the standing start position is instructed by the adjustment command section.

14. The caring device according to claim 1, wherein operation processing for assisting the standing operation includes a first process of revolving the second arm rearward in parallel with revolving the first arm forward at an initial stage of the standing operation.

15. The caring device according to claim 1, wherein the support member includes a trunk support portion formed in a planar shape, and configured to support a trunk in surface contact with a front surface of the trunk of the upper half body of the cared person, and a side support portion supported by the trunk support portion and configured to support a side of the cared person, and the reference position is set at a lower end or an upper end of a portion of the trunk support portion in contact with the trunk or a position of the side of the cared person.

* * * * *